2 Sheets—Sheet 1.
T. J. CAIN.
Hose-Reel.
No. 221,516.  Patented Nov. 11, 1879.
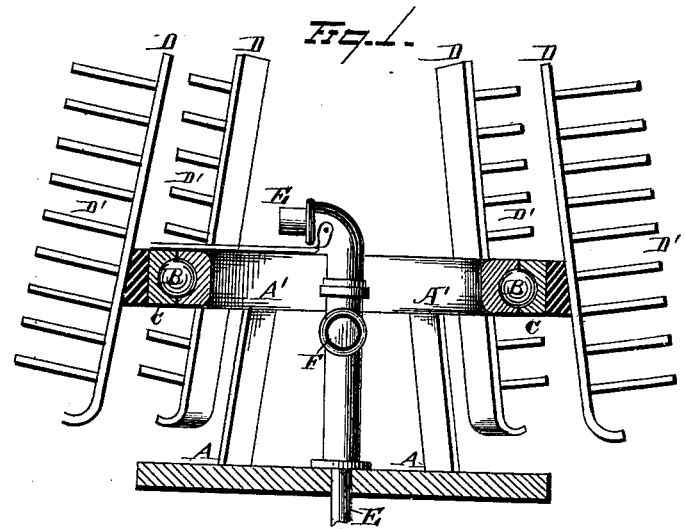
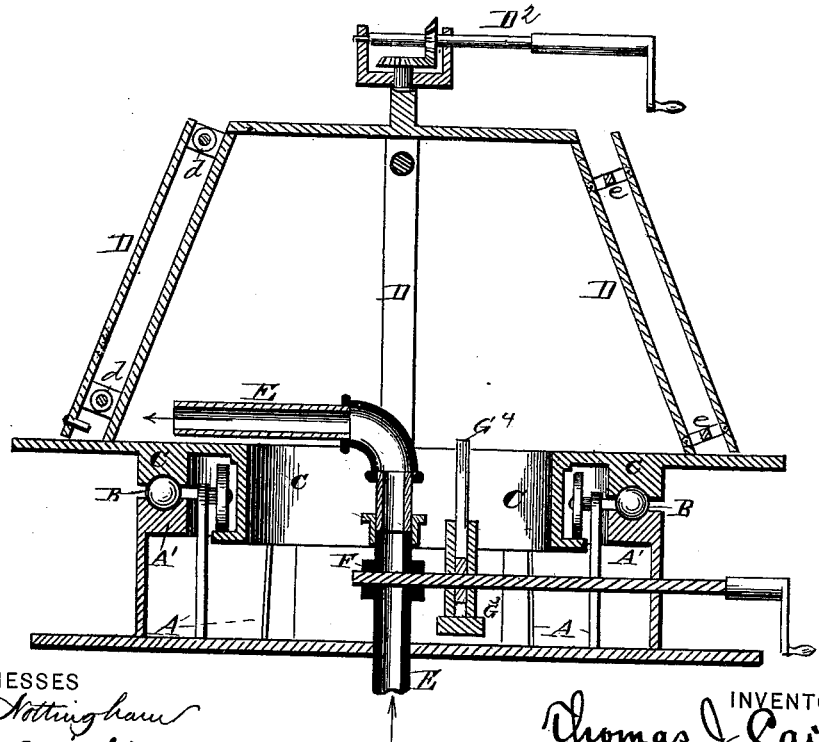
WITNESSES
E. J. Nottingham
A. W. Bright
INVENTOR
Thomas J. Cain.
By Leggett & Leggett
ATTORNEYS 2 Sheets—Sheet 2.
T. J. CAIN.
Hose-Reel.
No. 221,516. Patented Nov. 11, 1879.
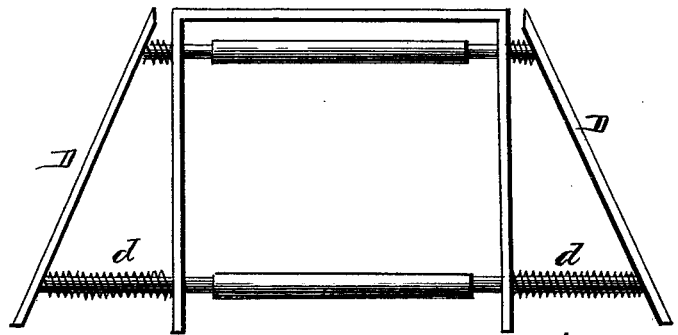
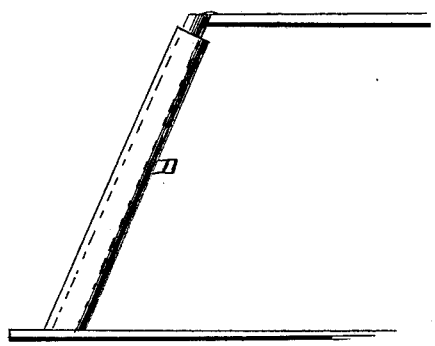
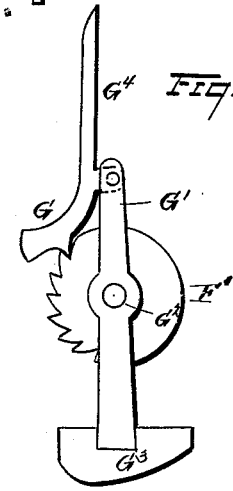
WITNESSES
INVENTOR

UNITED STATES PATENT OFFICE.

THOMAS J. CAIN, OF CLEVELAND, OHIO, ASSIGNOR, BY MESNE ASSIGN-
MENTS, TO ALFRED ADAMS, OF SAME PLACE.

IMPROVEMENT IN HOSE-REELS.

Specification forming part of Letters Patent No. 221,516, dated November 11, 1879; application filed June 28, 1878.

*To all whom it may concern:*

Be it known that I, THOMAS J. CAIN, of Cleveland, in the county of Cuyahoga and State of Ohio, have invented certain new and useful Improvements in Hose-Reels; and I do hereby declare the following to be a full, clear, and exact description of the invention, such as will enable others skilled in the art to which it pertains to make and use it, reference being had to the accompanying drawings, which form part of this specification.

My invention relates to hose-reels; and it consists, first, in an upright reel made to revolve upon a series of anti-friction rolls; secondly, in yielding or elastic arms, made and adapted as is afterward described and claimed, for the support of the hose; and, thirdly, in the construction and operation of the reel, that will more fully hereinafter appear.

In the drawings, Figure 1 is a vertical sectional view of my device. Fig. 2 is a vertical sectional view of a modified form of my invention. Figs. 3 and 4 are detached views of different styles of yielding or elastic arms. Fig. 5 is a detached view, showing the mechanism by which the valve is operated.

A represents any suitable frame for supporting the reel. A' is a casing or ring containing anti-friction rolls, and upon which the device revolves. This ring A' is composed of two concentric sections—an exterior section, C, and an interior, A'. The opposite opposing sides of these sections A' C are grooved to receive the balls B, by which they are locked together in such a manner as to prevent vertical displacement or parting of said sections, and at the same time allowing of a free and independent rotation of one section within or about the other.

The uprights of the frame A are rigidly attached to the interior section, A', of the ring, while to the outer section, C, are attached, preferably by dovetail, the arms D. These arms may be made of any suitable material, and either rigid or yielding. I prefer the use of yielding arms, although they are not necessary to the successful working of my device.

E represents a stationary stand-pipe, to which the hose is attached either directly or by means of an elbow and packed joint, as shown in Fig. 1. This stand-pipe is connected with the water-supply, and is supposed to have hydrant-pressure to the valve F at all times. This valve is operated automatically, as shown in Fig. 5, by the revolution of the reel caused by withdrawing the hose, by means of a weighted pawl, G, and ratchet F'. The pawl G is supplied with a lever, $G^4$, which is operated upon by an arm rigidly attached to and connecting the stand-pipe and outer section, C, of the ring A'.

The lever $G^4$ is ridden down by the arm above described, the weighted pawl operates the ratchet, which is attached to the valve, and the weight $G^3$ returns the lever to an upright position, to be again ridden down by the arm, as above described, at each revolution of the reel. By this means the valve is opened and the hose supplied with water as it is being drawn from the reel.

The different forms of yielding arms are fully illustrated in the drawings. In Fig. 2 are shown two designs for yielding arms. One is a sliding bar upon rollers $d$, and as the reel is conoidal in form, as the arm is moved toward the apex it performs the office of a yielding arm. The other design is that of the well-known parallel ruler. In Fig. 3 is shown another form of yielding arm, where the object is attained by means of coil-springs, against which the arms are made to bear. In Fig. 4 is a loose sliding sleeve incasing the arm proper, and upon which it is intended to slide.

In Fig. 2 is shown a modification of my invention, wherein the ring A' is divided horizontally into sections, instead of vertically, as shown in Fig. 1. In this modified form the necessity of an upper brace or support is apparent; otherwise the upper portion or the reel proper would be liable to be lifted or overturned by the action of withdrawing the hose. The same friction-rolls, however, are used for the support and to perform the office of turntable for the reel.

Pinions and crank, as shown at $D^2$, Fig. 2, may be attached to the reel, for the purpose of reeling the hose.

Having thus described my invention, what I claim is—

1. In combination with a hose-reel and its frame or standard, an annular series of anti-friction balls, B, substantially as described and shown.

2. A hose-reel supported by and revolving upon an annular series of anti-friction balls, B, substantially as described and shown.

3. The ring herein specified, consisting of two concentric sections, A' C, divided on a line parallel with their axes, and locked by the anti-friction balls B, said balls resting partly in a groove formed on the periphery of the section A' and partly in a groove formed on the inner face of the section C, whereby said ring-sections are prevented from displacement, and at the same time permitted free revolution independent of each other, substantially as described and shown.

4. In an upright hose-reel whose arms are relatively arranged in conoidal form, an inclined arm adapted to have movement in a horizontal plane, and thus automatically adjust itself to the horizontal pressure imposed upon the reel by the hose, substantially as and for the purpose described.

In testimony whereof I have signed my name to this specification in the presence of two subscribing witnesses.

THOMAS J. CAIN.

Witnesses:
   JNO. CROWELL, Jr.,
   THOS. B. HALL.